United States Patent

Tanaka et al.

[15] 3,645,540

[45] Feb. 29, 1972

[54] DEVICE FOR CONNECTING ELECTRICAL CIRCUITS

[72] Inventors: Yoshinobu Tanaka, Warabi-shi; Kiyoshi Takahashi, Saitama-ken, both of Japan

[73] Assignee: Teikoku Dempa Co., Ltd., Tokyo, Japan

[22] Filed: June 19, 1969

[21] Appl. No.: 834,680

[30] Foreign Application Priority Data

| | | |
|---|---|---|
| Nov. 25, 1968 | Japan | 43/102104 |
| Nov. 28, 1968 | Japan | 43/103245 |
| Oct. 28, 1968 | Japan | 43/93290 |
| Oct. 28, 1968 | Japan | 43/93291 |
| Oct. 28, 1968 | Japan | 43/93288 |
| June 9, 1968 | Japan | 43/51269 |
| Oct. 10, 1968 | Japan | 43/93289 |

[52] U.S. Cl. ....274/4 R

[51] Int. Cl. ....G11b 5/00

[58] Field of Search ....274/4, 11; 339/176, 191, 192, 339/184

[56] References Cited

UNITED STATES PATENTS

| | | | |
|---|---|---|---|
| 2,380,151 | 7/1945 | David | 339/176 P |
| 2,662,975 | 12/1953 | Schwarz | 179/100.11 |
| 2,664,552 | 12/1953 | Ericsson et al. | 339/192 R |

OTHER PUBLICATIONS

Publication: Automatic Radio, " Universal FM Radio Pak Tuner" 2/68 Melrose, Mass.

*Primary Examiner*—Harry N. Haroian
*Attorney*—Linton & Linton

[57] ABSTRACT

A jack and plug connector for electrical circuits and particularly cartridge-type tape players or radio receiving equipment with the plug being mounted on the chassis of the tape player and the jack being mounted on or a part of the cartridge insertable in the tape player whereby when the cartridge is inserted in the tape player, the jack and plug are plugged into one another providing an electrical connection between the circuits of the tape player and the cartridge.

11 Claims, 13 Drawing Figures

INVENTORS
YOSHINOBU TANAKA AND
KIYOSHI TAKAHASHI

BY Linton and Linton
ATTORNEYS

INVENTORS
YOSHINOBU TANAKA AND
KIYOSHI TAKAHASHI

BY Linton and Linton
ATTORNEYS

INVENTORS
YOSHINOBU TANAKA AND
KIYOSHI TAKAHASHI

BY Linton and Linton
ATTORNEYS

DEVICE FOR CONNECTING ELECTRICAL CIRCUITS

It is generally practical to insert a tape cartridge or cartridge of a tuner system into the player main body in a cartridge tape player or radio receiving equipment, and in such cases it is necessary to provide an electrical connection between a tape player and a cartridge including inserted electrical circuits. For this purpose, connecting elastic pieces are arranged on the cartridge receiving part of the tape player, and a convex contacting part is so equipped in the cartridge as to adapt to the arranging places of said elastic pieces, which is performed by utilizing the bottom part of the cartridge. However, in such a tape player great reduction of elasticity is brought about to the contacting piece which is to be connected by modifying the thickness of the cartridge case and that of the inserting and removing part of the tape player main body. Loss of elasticity naturally occurs on those contacting pieces upon the frequent inserting and removing of the tape cartridge and other devices, and this is the great cause of poor connections. The connecting equipments are provided with difficulties on the cartridge receiving part due to the limited space, so that there are many dispersions on those connecting parts and others, besides as the tape player receiving part is a little free, connection is often imperfect owing to insertions of the cartridge. Generally, when the cartridge is fitted on the receiving part of the tape player of a different maker, it has been impossible to obtain interchangeability among many tape players on account of different sizes.

The present invention has been devised through investigations in order to remove the above-mentioned defects or prior arrangements. That is to say, the fundamental object of this invention is that when this present device is adopted it serves for connection between said tape player and cartridge, space therefor is not particularly required, and further provides a device for connecting circuits which can stay secure in the connected state for a long period. As is well known, it is essential to provide a detector for switching tracks of tape in the tape player, and this invention utilizes a part of such a detector so as to arrange the above mentioned connecting mechanism of the electrical circuits, thereby enabling to accomplish the exact connection within the limited space such as the inserting end portion of the cartridge without a special space for such a connecting arrangement of the electrical circuits. Such connecting members are utilized as fitting or maintaining members as well as the connecting members themselves by appropriately deforming the members in themselves concerning said detector, so that not only suitable products are obtained as to the mechanical strength on electric efficiencies but also the connecting pieces are slid to the length direction thereof at inserting and removing the cartridge and those elasticities are fully utilized to create the suitable state of electrical connection for a long period.

Another object of the invention is to provide an equipment which is compactly devised as a connecting device of the electrical circuits, thereby enabling to always compose the accurate connecting relation as well as to maintain the suitable elastic effect for the electric connection. For this purpose, this invention provides a plurality of rod-shaped connecting parts in parallel to the detecting metals sensing metals, thereby enabling to arrange a plurality of connecting members within the area of the arranging detecting metals, taking enough space, moreover the contacting pieces of the cartridge side opposite to such receiving seats are plate shapes, and even if they are very nearly placed to each other, the accurate connection is composed every time. Already mentioned, the cartridge of the tape player cannot avoid a little discrepancy when the cartridge is inserted into and removed from the tape player, and therefore if connection is effected between the connecting pieces arranging the plated pieces in parallel, there occurs great possibility that connection will be made to those adjacent connecting pieces which are placed in parallel, and consequently smooth connection cannot be composed, but rod- or pin-shaped connecting members as mentioned above are adopted as the connecting means of one side, whereby such a risk can be exactly avoided. In addition, said connecting members effect suitable elastic workings to any directions and its elastic workings are not reduced by frequent insertion and removal. The thickness thereof is of course limited in accordance with that of the plated connecting piece, and they are smoothly arranged in the extent of thickness of the cartridge without any difficulties even when they are provided in layer together with the sensing metal.

Another object of this invention lies in utilizing the sensing metal itself as the connecting member for circuits, and in this way numbers of the connecting member are decreased, resulting in accomplishing the purpose of connecting circuits on the part of said detector. It is the reason for utilizing the sensing metal to accomplish together the connection of the electric source, that of antenna and that of output when the radio receiver is formed by utilizing this kind of tape player, and for this purpose, arrangement of at least five connecting members are virtually required. It is next to impossible to assemble such five connecting members on the part of the detector even if the above-mentioned rod- or pin-shaped members are adopted. The sensing metal itself becomes the circuit-connecting member, whereby the number of the rest are three and it is possible to assemble many connecting purposes on one part.

Another object of this invention is to utilize the above-said sensing metal as guide members for the insertions and removals of the cartridge and said connecting members. For this purpose, the cartridge is formed with the guide part to accept the sensing metal, and upon inserting the cartridge the sensing metal is to be smoothly pushed into the cartridge, whereby not only the insertion and removal of the cartridge is smooth, but also the insertion and removal of the connecting member for each circuit arranged on the circumference of said sensing metal are secured and those connected places are accurately maintained, and the ideal inserting and removing operation as well as the connected state are always obtained.

Another object in the embodiments of this invention is to rigidly fix the aforestated rod- or pin-shaped connecting member on the fitting base of the sensing metal member, besides is to provide preferable connected parts to lead wire or others. As above stated, the rod- or pin-shaped connecting member has such an advantage as not being bulky and as it can be arranged within the limited space, but to the contrary, it has such disadvantage as its fixture to the fitting base is not stable and as exact fitting is not to be obtained. Further the lead wire is not easy to be connected. In order to avoid such disadvantages in the embodiments of this invention, the part fixed to the fitting base is enlarged in a curve and this enlarged part is cylindrically shaped from the back end portion. In this way, fixture to the fitting base is exact, especially the preferable elastic connecting work is secured in the connected part, and simultaneously the lead wire is connected without fail by utilization of the cylinder part.

Another object in the embodiments of this invention is to provide a mechanism in which the connecting seat to be equipped in the cartridge is easily composed and decomposed. This connecting seat requires five connecting pieces regarding the composed purpose of each of circuits, and those pieces must be arranged in multilayers. Thus, this invention holds securely and concentrically lots of connecting pieces in the simple composition, and they are so equipped as to be easily mounted and dismounted.

Another object in the embodiments of the invention does not require any fixing means such as a stopper or stopping metal at all, but is to obtain connecting seat secured with above-mentioned many endpieces. It means the arrangement of a plurality of members to use a stopper or stopping metal in this kind of connecting metal members, and it is unavoidable requirement in case rigid composition is obtained. However, such stopper or stopping metal are metallic material, which makes the composition complicated, moreover greatly reduces the electric insulation distance. Especially, such a reduction of insulation distance is very undesirable in the case of concentrically arranging above-mentioned many connecting members in the limited part. While the rigid composition is secured, this invention is to provide the connecting seats which do not require such fixing means as above stated stopper or stopping metal. In this way, the full electric insulation distances are obtained, thereby enabling to appropriately provide the fixing seats which can equip concentrically many connecting metal within the limited space.

Many other features and concrete embodiments of this invention can be clearly understood with reference to the attached drawings as shown hereunder, in which.

Figure 1:
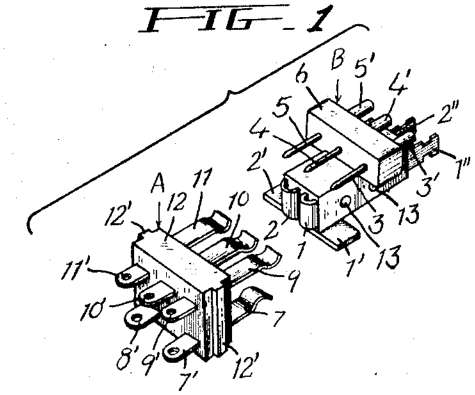
FIG. 1 is an exploded perspective view showing the jack and plug of this invention facing each other.
Figure 6:
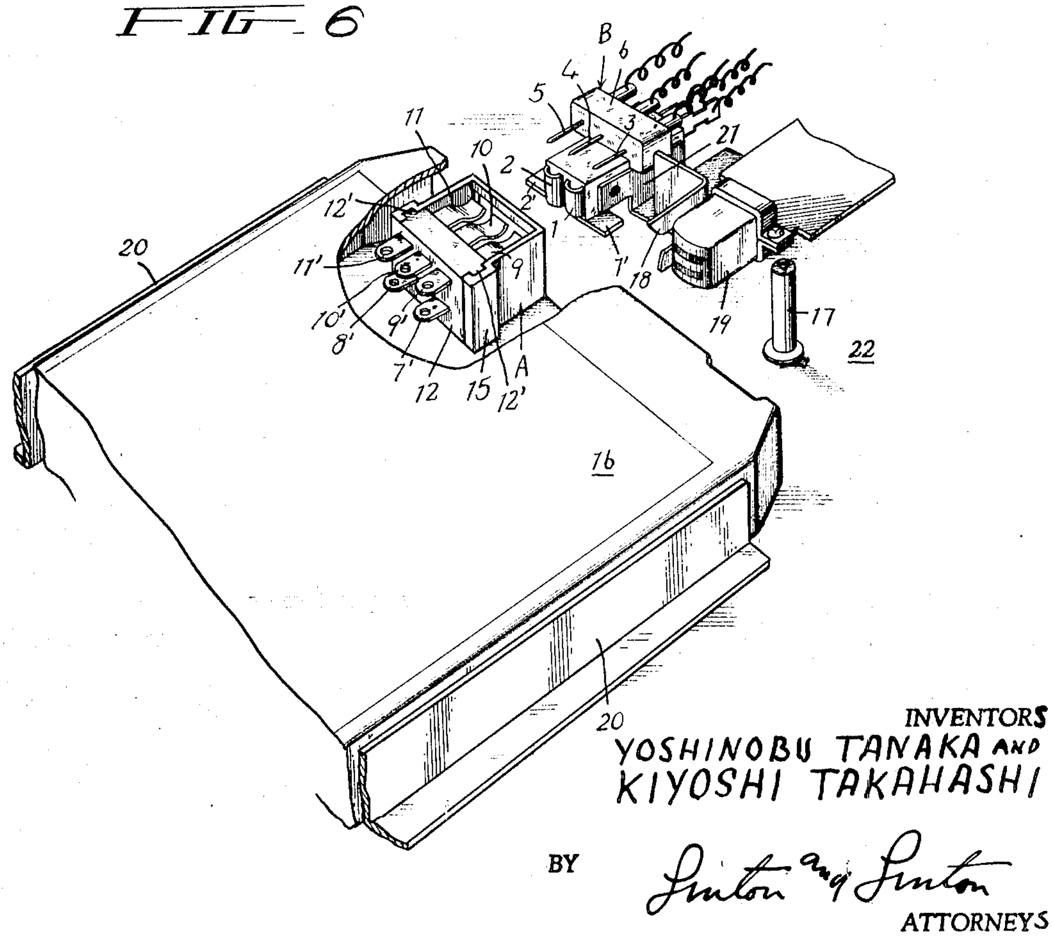
FIG. 6 is a fragmentary perspective view, partially in section, illustrating the members shown in FIGS. 1 to 5 as utilized in a tape player.

To explain the present invention with reference to the drawings; FIG. 1 concerns the first embodiment of this invention wherein the plug B and the jack A are opposite each other before connection. The plug B is mounted in the tape player main chassis 22, and the jack A is mounted on the front part of the cartridge 16 having the electric circuit arrangement, as shown in FIG. 6. The jack A is equipped with resilient contacting fingers 7 and 8 on the lower part thereof and is equipped on its upper part with resilient contacting fingers 9, 10, 11. Those fingers 7 to 11 have end portions 7', 8', 9', 10', 11', respectively, which extend through and out of the opposite side of the block 12 in which those fingers are completely molded. Each of the contacting pieces 7 to 11 is a resilient piece which has sufficient width to adapt to a little discrepancy in the position of the jack relative to the plug. 12' indicates a pair of keys on block 12 which each engage a slot in the ends 15 of a cover case 14 covering the jack member to avoid other insertions, and this case 14 is a U-shape frame, the sides of which provides said ends 15, 15. Said case 14 is provided with opening **14*a* at the front side thereof, and said front side has projections 14*b* opposite each other to accept metal sensors 1, 2 therebetween. Said case is fitted within the cartridge 16 so that a covering arrangement similar to the usual connector is accomplished. Said plug B has the contacting members 1', 2', 3, 4, 5 molded in the fitting block 6 to perfectly correspond to the contacting fingers 7, 8, 9, 10, 11 of said jack A, and said contacting members 1', 2', 3, 4, 5 having projecting end parts 1'', 2'', 3', 4', 5'. The contacting members 1', 2' are formed by bending extended parts of the metal sensors 1, 2 whose end portions are formed in a U-shape for switching channels when playing back. Said sensors 1, 2 are so formed as to avoid direct contact with other members when using the cartridge. Said contacting members 1', 2' are strengthened in their resiliency, and the bending structure thereof provides increased strength and elasticity. The contacting members 3, 4, 5 are pin shaped to fit in narrow spaces, and adapt to discrepancies in the longitudinal direction of the electrical cartridge, have a little resiliency, and contact the resilient contacting fingers 9 to 11 of the jack A along their length, and are smoothly contacted or withdrawn in response to the insertion and removal of the cartridge 16, thereby supporting the resilient effect at their contact, especially as those members have no directional inclinations in elasticity, they provide a useful contacted state to any insertions for a long period. 13 is a stopping hole for a screw, vis for mounting the plug on a tape player chassis 22 by means of an L-shaped metal member 21 or a tape-guiding metal member 18**.

FIG. 6 shows that the cartridge 16 of the electrical circuit equipment including the jack A is opposite to the tape player chassis 22 including plug B. The cartridge 16 having the electrical circuit equipment providing the jack body A is inserted along the cartridge guiding rails 20 to contact the capstan 17, head 19, tape guide 18 and plug body B, and the electric circuit in the cartridge 16 is connected to the electric circuit in the tape player by the effective perfect connection of the plug B and the jack A, thereby performing the required movement serving an inner mechanism of the tape player.

Figure 7:
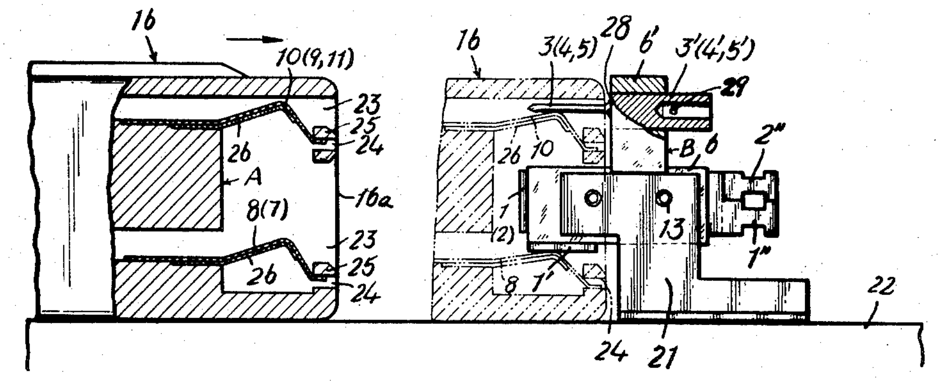
FIG. 7 is a fragmentary side view, partially in section, illustrating the plug and the jack opposite each other in a second embodiment of this invention, and illustrating in broken line the inserting condition of the jack relative to the plug.
Figure 8:
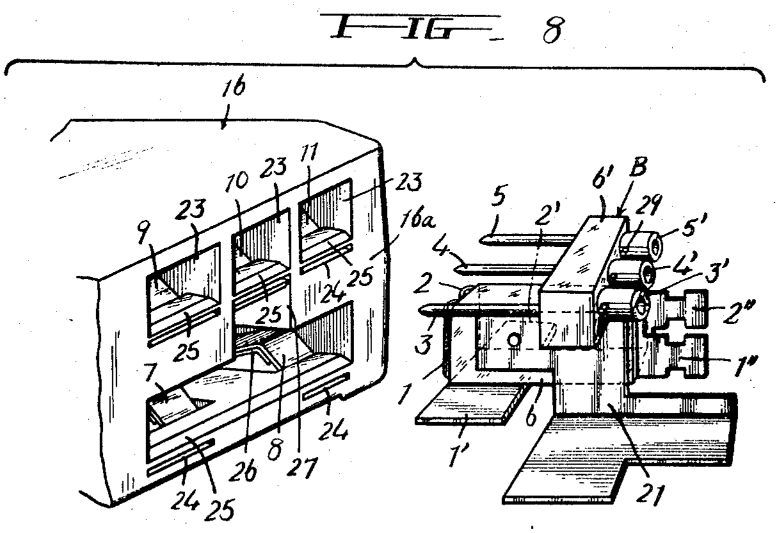
FIG. 8 is a perspective view of the elements shown in FIG. 7.
Figure 9:
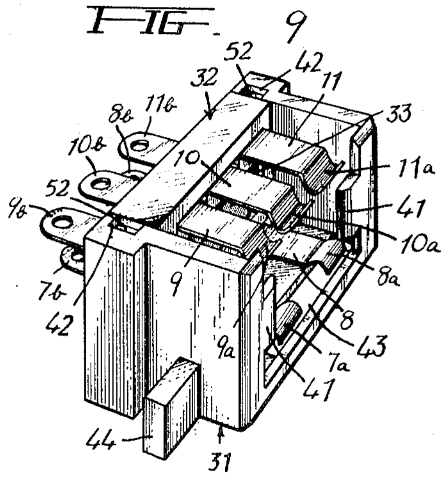
FIG. 9 is a perspective view of the jack of a third embodiment of the invention.

FIGS. 7 and 8 show the second embodiment according to this invention. That is, FIG. 7 is a view, partially in section, illustrating the jack and the plug opposite to each other as well as their connected state in broken lines. The plug B is mounted on the tape player chassis 22, and the jack A is provided on the front of the cartridge 16 having the electric circuit equipment, which is the same as those in FIGS. 1 to 6. The jack A is provided with the resilient connecting fingers 7, 8 on the lower part of the cartridge 16 and with end portions of the resilient connecting fingers 9, 10, 11 in parallel on its upper part. The middle parts of those contacting fingers 7, 8, 9, 10, 11 are curved in order to be passed to respective contacting pieces of the later mentioned plug B, and the point of those pieces face slots 24 formed below the lower part of the plug insertion openings 23 and they are always fitted with engaging plates 25 which are formed between the openings 23 and the openings 24, and those contacting pieces 7, 8, 9, 10, 11 are respectively joined with elastic auxiliary pieces 26 on the undersides thereof to provide full resiliency. As is well known, the cartridge 16 is freely inserted and removed in said guide rails 20 furnished on the tape player chassis 22, and said contacting fingers 7, 8, 9, 10, 11 are of course connected to the electric circuit in said cartridge.

Figure 2:
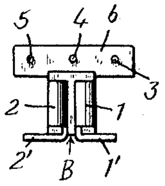
FIG. 2 is a front view of the plug.
Figure 3:
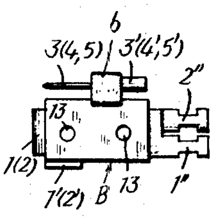
FIG. 3 is a side view of the plug.
Figure 4:
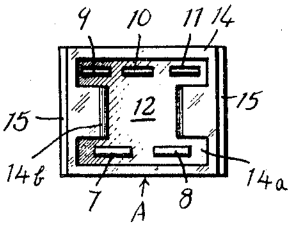
FIG. 4 is a front view of the jack.
Figure 5:
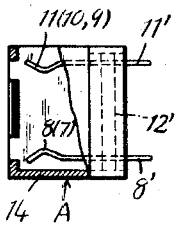
FIG. 5 is a side view of the jack, partially in section.

The body of plug B is molded with the fitting block 6 of synthetic resin or the like in order to place the contacting members, 1, 2, 3, 4, 5 at positions opposite to the contacting fingers 7, 8, 9, 10, 11 of the jack A, which is shown in FIG. 1 to FIG. 2. Said fitting block 6 has a lateral part 6' supporting the upper contacting members 3, 4, 5, and such contacting members 1, 2, 3, 4, 5 project backwards to form the connecting parts 1'', 2'', 3', 4', 5'. As illustrated in FIG. 1 to FIG. 6, the connecting members 3, 4, 5 are pin shaped so that they are effective in narrow space and the basic part thereof is enlarged with the curve 28 to provide tubular connecting parts 3', 4', 5' which tubular parts respectively form gas outlets 29 to connecting lead wires by means of soldering. 27 is a convex hole formed on the cartridge 16 and accepts the sensors 1, 2.

Figure 10:
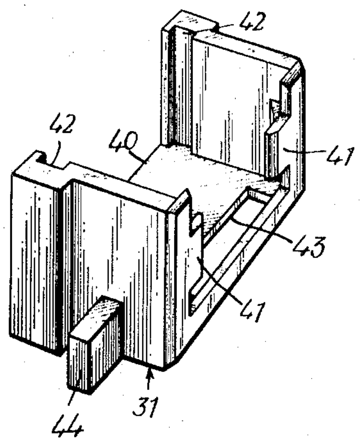
FIG. 10 is a perspective view of the case of the jack of FIG. 9.

FIGS. 9 to 13 show the jack A of the third embodiment of this invention, i.e., the arrangement thereof consists of the cover case 31, the end part attaching seat 32, the mounting frame 33 fitted therein, and a plurality of fingers 9, 10, 11 and 7, 8 being vertically opposite. As shown in FIG. 10, the cover case 31 is substantially hexahedral, and the main body 40 whose top and back are open and whose cross section, is U-shaped is provided with projections 41, 41 having appropriate length, and the both sides of its back part has respective fitting-unfitting grooves 42, which is the same as the above-mentioned ones shown in FIG. 1 to FIG. 6, and further an engaging hole 43 is provided at the bottom, and extensions 44 are formed at both outsides, thereby suitably connecting the housing of the cartridge for a radio receiver. The end part attaching seat 32 to be attached to said cover case 31 has on its ends, tongues 52 to engage said fitting-unfitting grooves 42, 42, and a concave chamber 57 for detachably receiving a mounting body 33, which is vertically arranged with a groove 51 and a pressing part 55 for inserting end fingers 9, 10, 11 and 7, 8, and a projecting piece 53 is provided in the central part among said end fingers 9, 10, 11. Furthermore the mounting body 33 to be mounted onto the concave chamber 57 of this end part attaching seat 32 has a suitable size for fitting into this concave chamber 57, and its upper and lower parts are respectively arranged with projecting seats 54, 55 pressing end fingers 9, 10, 11 and 7, 8, and the grooves 51 between the projecting seats 54, 54 are placed to receive said projecting fingers 53. The endpieces 9, 10, 11 and 7, 8 are all of the same shape, one of which is representatively shown in FIG. 13 and whose respective points form contacting fingers 9*a* or 10*a*, 11*a* of 7*a*, 8*a* and whose basic parts 9*b* of 10*b*, 11*b* or 7*b*, 8*b* and whose center parts form respection two bent parts 9, 10, 11 or 7, 8 inserted into said projecting seats 54 or 55 are provided on the inside of the concave chamber 57 by means of the first bent seat 36 or 36', and the end fingers reached to the inside of the concave chamber 57 are projected to the outside of the end parts attaching seat 32 by means of the second bent parts 37 or 37'.

Figure 11:
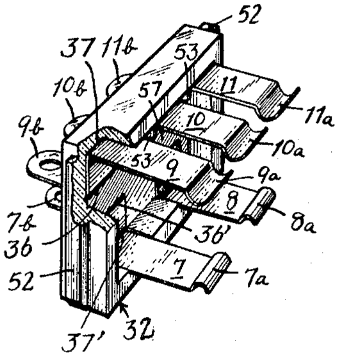
FIG. 11 is a perspective view of the fitting seat for the contacting piece of the jack of FIG. 9.
Figure 12:
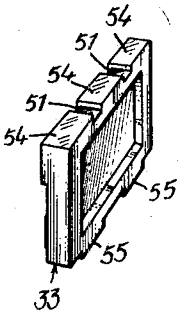
FIG. 12 is a perspective view of the mounting body to be attached to the above seat of FIG. 11.
Figure 13:
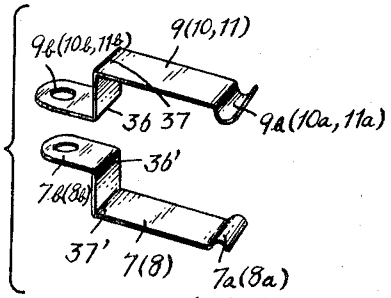
FIG. 13 is a perspective view of the contacting piece.

To explain the relationship of the arrangement according to the present invention as shown in FIGS. 9 to 13;

The basic parts 9*a*, 10*a*, 11*a* or 7*a*, 8*a* of end fingers 9, 10, 11 or 7, 8 are inserted into the projecting seats 54 or 55 as illustrated in FIG. 11, and thereafter the mounting body 33 is mounted onto the concave chamber 57, and in this way, the arranged end fingers 9, 10, 11 or 7, 8 are fitted in between the end parts attaching seat 32 and the mounting body 33 to the extent fully including the two bent parts 36, 37 or 36', 37' of the center thereof, and a stable arrangement is formed and kept in company with the bending composition. In this connection, when such an attached state is to be made more stable, the inside of the mounting body is coated with a binary agent for mounting. In any way, after having been arranged in above manner, the engaging parts 52 of the end part attaching seats 32 are engaged with the fitting-unfitting grooves 42 of the case, thereby enabling to easily provide the electric connecting means with very stable endpieces.

That is to say, in the composition shown in FIG. 9 to FIG. 13 a plurality of end fingers can be arranged in a very stable state by the more composing system without the fixing means such as stopper on stopping metals. That the stopper or stopping metals are not thus required and this simplifies the setting up of work as well as appropriately provides the electric insulation distance, so that the causes, of electrical hindrances are exactly concelled, though lots of end parts are arranged.

I claim:

1. A device for connecting electrical circuits comprising a cartridge type tape player, a plug body having a lateral block thereon, a pair of metal sensors each having U-shaped ends on one end of said plug body and extending therethrough, contacting members integral with said sensor U-shaped ends and extending laterally of said plug body, a plurality of pin contacts extending through and from said block, a jack body, resilient contact fingers extending through said jack body and each positioned for detachably engaging one of said contacting members and pin contacts when said plug body is engaged with said jack body providing an electrical connection between said contact fingers and said contacting members and pin contacts and a cover case of a U-shape having ends detachably engaging said jack body, enclosing said contact fingers and an opening for receiving therethrough said contacting members and pin contacts when said plug body is plugged into said jack body.

2. A device for connecting electrical circuits as claimed in claim 1 wherein said plug body is mounted on the tape player chassis for utilizing said sensors as the sensing member for the electromagnetic tape of the tape cartridge and said jack body is mounted on said tape cartridge facing an opening in said cartridge.

3. A device for connecting electrical circuits as claimed in claim 2 wherein the case of said cartridge provides a cover for the upper and lower sides of said housing.

4. A device for connecting electrical circuits as claimed in claim 3 including a supporting member mounted on said tape player chassis attached to and supporting said plug body above said chassis.

5. A device for connecting electrical circuits as claimed in claim 1 wherein said cover case has projections extending into said cover case opening and some of said contact fingers extend above said projections and some of said contact fingers extend below said projections, said plug body being capable of insertion below said projections and said lateral block being capable of insertion above said projections.

6. A device for connecting electrical circuits comprising a cartridge type player and radio receiver, a plug body mounted in said tape player and having a lateral block, a pair of metal sensors each having a U-shaped end on one end of said plug body and extending therethrough, contacting members integral with said sensor U-shaped ends and extending laterally of said plug body, a plurality of pin contacts extending through and from said block, a cartridge insertable in said tape player having a plurality of openings in one side thereof and slots below said openings, a plurality of contacting fingers attached at one end to and positioned within said cartridge, having bent medial portions positioned for engaging said contacting members and pin contacts when said plug body is plugged into said cartridge and opposite ends extending into said slots.

7. A device for connecting electrical circuits as claimed in claim 6 including resilient auxiliary members attached at one end to said cartridge and supporting said contacting fingers medial bent portions.

8. A device for connecting electrical circuits as claimed in claim 1 wherein said pin contacts have enlarged end portions extending through said lateral block.

9. A device for connecting electrical circuits as claimed in claim 8 wherein said pin contact enlarged end portions are cylindrical providing a connections for the tape player lead wires thereto.

10. A device for connecting electrical circuits as claimed in claim 1 wherein said jack body has a recessed face, said fingers are bent at one end and have said bent ends positioned in said recessed face, a frame is detachable mounted in said recessed face with the sides of said frame supporting said fingers and an end of said frame retaining said finger bent ends against said jack body.

11. A device for connecting electrical circuits as claimed in claim 10 wherein said jack body recessed face has projections and slots and said frame has slots and projections for mating respectively with said jack body projections and slots.

* * * * *